Patented Apr. 13, 1926.

1,580,527

UNITED STATES PATENT OFFICE.

WILLIAM G. PARMELE, OF SEATTLE, WASHINGTON.

LOCK.

Application filed July 30, 1925. Serial No. 47,082.

*To all whom it may concern:*

Be it known that I, WILLIAM G. PARMELE, a citizen of the United States, residing at Seattle, in the county of King and State of Washington, have invented a new and useful Lock, of which the following is a specification.

This invention relates to a lock designed primarily for use in connection with a spare wheel holder such as commonly carried by automobiles.

It is an object of the present invention to provide a means whereby a spare wheel can be held tightly to the holder and it becomes impossible to remove it without the use of a special key.

A further object is to provide a structure of this character which eliminates all rattling due to a loose mounting of the wheel.

A still further object is to provide a structure of this character which is simple in construction, compact, durable and efficient.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a front elevation of the structure constituting the present invention, a portion of an engaged spare wheel being indicated in position.

Figure 2 is a section on line 2—2 Figure 1.

Figure 3 is a section on line 3—3 Figure 2.

Figure 4 is a section on line 4—4 Figure 2.

Referring to the figures by characters of reference 1 designates arms constituting means for connecting the spare wheel holder to an automobile and these arms, in the present instance, are attached to a flange 2 extending around one end of a block 3. This block is provided with a bore 4 which is screw threaded as shown at 5. The inner end of the bore is tapered at 6 and those portions of the threads 5 adjacent the tapered end of the bore are grooved longitudinally to provide teeth for engagement by a pawl as hereinafter explained. These grooves have been indicated at 7.

Threaded bolts 8 are extended from the collar 2 and are adapted to extend through openings formed in the disk *a* of a spare wheel, there being nuts 9 for engaging these bolts to clamp the disk in place as shown particularly in Figure 2.

The bore 4 is adapted to receive a screw threaded plug 10 having an angular outer end portion 11 constituting a nut whereby the plug can be screwed into or out of the bore. This plug has a flange 12 sufficiently large to lap the disk *a* and clamp it against the collar 2 as shown in Figure 2.

Under normal conditions all of the tumblers 27 are pressed against the inner end April 13, 1926.
J. B. PERKINS
TOOL
Filed June 28, 1921
1,580,528
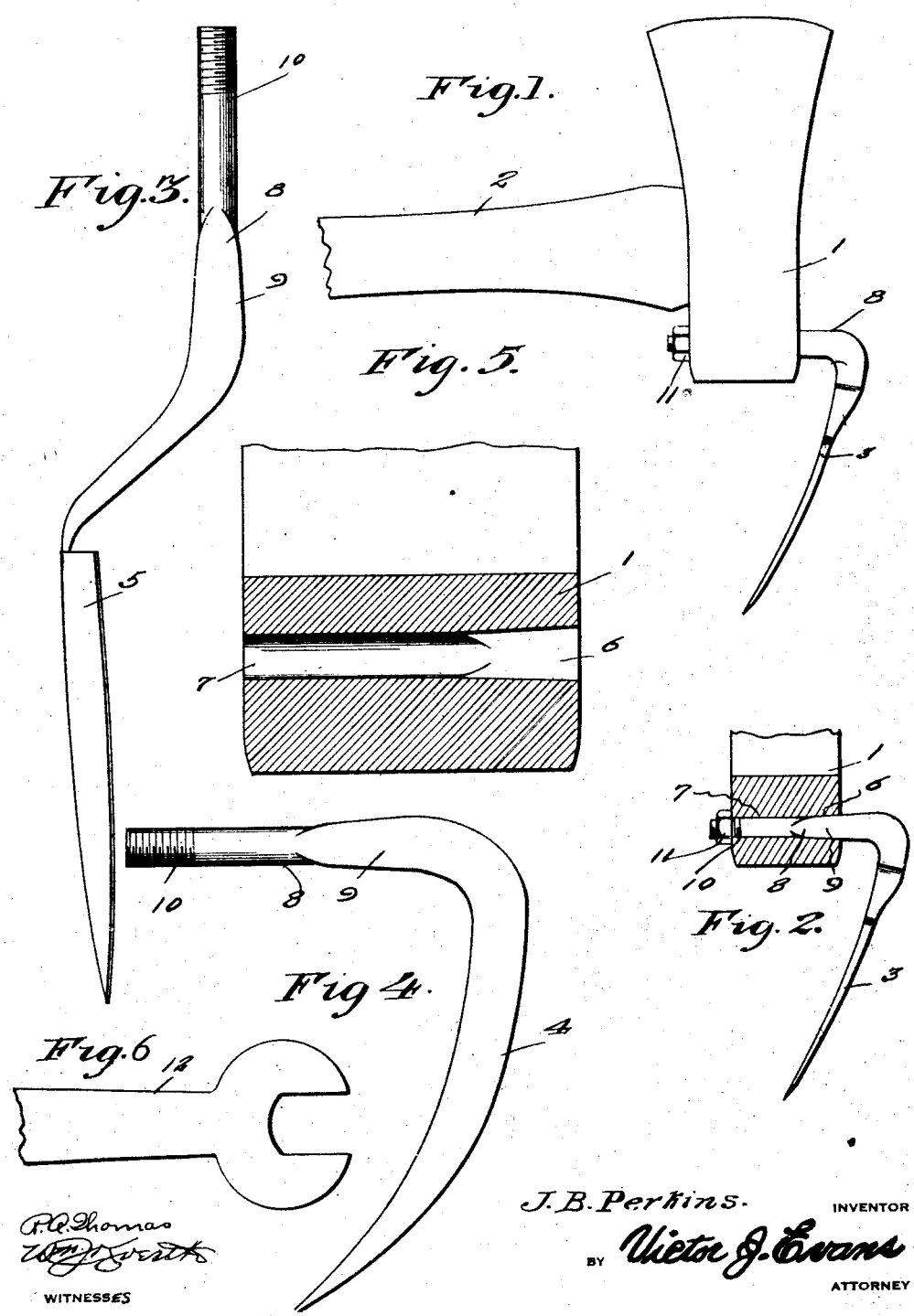

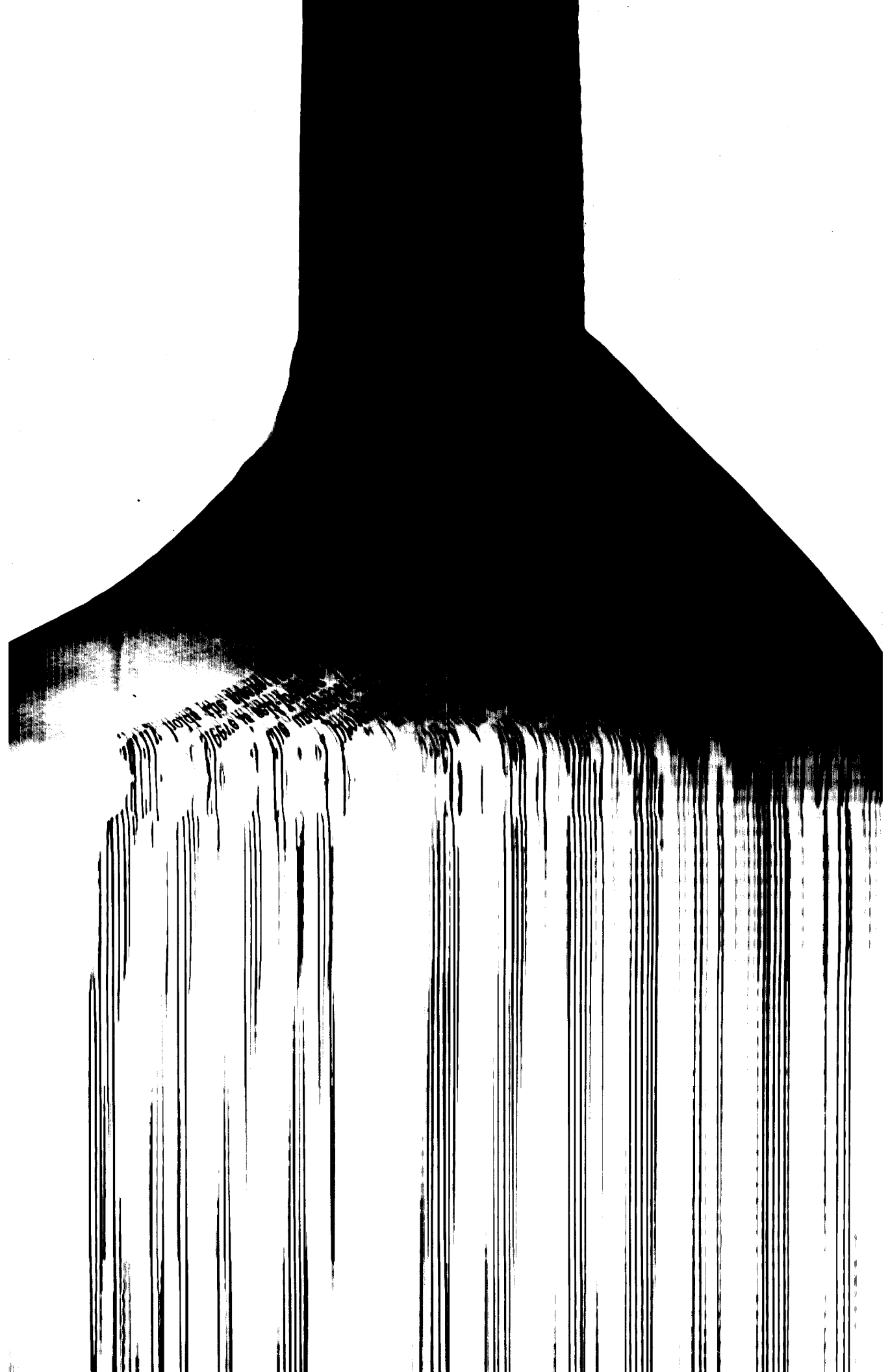

The inner end of the plug is tapered at 13 to fit snugly within the tapered portion 6 of the bore 4. Extending radially within the plug near this tapered portion is a recess 14 opening through the periphery of the plug and having a bolt 15 slidable therein. At the outer end of this bolt is a pawl 16 in the form of a ratchet tooth adapted to be seated in any one of the grooves 7. One or more springs 17 are located back of the bolt 15 so as to hold said bolt normally projected and a transverse slot 18 is formed in the bolt. This slot receives a wrist pin 19 eccentrically mounted at one end of a cylinder 20 adapted to rotate within a bore 21 formed within the plug 10. This cylinder has a central key receiving recess 22 adapted to register with a key receiving opening 23 in the outer or closed end of the plug 10. Radial openings 24 communicate with the recess 22 and extend through the periphery of the cylinder 20. Corresponding radial recesses 25 are formed in the plug 10 and communicate with the bore 21. The diameters of the openings 24 are greater than the width of the key receiving recess 25 so that the inner end walls of the openings 24 intersect the side walls of the key receiving recess as shown particularly in Figure 4. Consequently these inner ends 26 constitute abutments for tumblers or pins 27 slidable in the openings 24 and of different lengths. Additional tumblers 28 in the form of pins are slidable within the recesses 25 and are normally pressed by springs 29 seated in the recesses.